(12) United States Patent
Sato (10) Patent No.: US 11,143,274 B2
(45) Date of Patent: Oct. 12, 2021

(54) CHAIN TENSIONER

(71) Applicant: TSUBAKIMOTO CHAIN CO., Osaka (JP)

(72) Inventor: Yoji Sato, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 273 days.

(21) Appl. No.: 16/268,735

(22) Filed: Feb. 6, 2019

(65) Prior Publication Data

US 2019/0257389 A1 Aug. 22, 2019

(30) Foreign Application Priority Data

Feb. 16, 2018 (JP) ............................. JP2018-025990

(51) Int. Cl.
*F16H 7/08* (2006.01)

(52) U.S. Cl.
CPC ............. *F16H 7/0836* (2013.01); *F16H 7/08* (2013.01); *F16H 2007/0802* (2013.01); *F16H 2007/0806* (2013.01); *F16H 2007/0812* (2013.01); *F16H 2007/0814* (2013.01); *F16H 2007/0859* (2013.01)

(58) Field of Classification Search
CPC .............. F16H 7/08; F16H 2007/0812; F16H 2007/0814; F16H 7/0836; F16H 2007/0878; F16H 2007/0895; F16H 2007/0897; F16H 2007/0806; F16H 2007/0859; F16H 2007/0891
USPC .......................................................... 474/110
See application file for complete search history.

(56) References Cited

U.S. PATENT DOCUMENTS

| | | | | |
|---|---|---|---|---|
| 4,708,696 A | * | 11/1987 | Kimura | F16H 7/1236 474/103 |
| 5,569,105 A | * | 10/1996 | Sakai | F02B 67/06 474/110 |
| 5,649,878 A | * | 7/1997 | Noguchi | F16H 7/08 474/110 |
| 5,700,213 A | * | 12/1997 | Simpson | F16H 7/0848 474/110 |
| 5,707,309 A | * | 1/1998 | Simpson | F16H 7/08 474/110 |
| 5,720,684 A | * | 2/1998 | Mott | F16H 7/0848 474/101 |

(Continued)

FOREIGN PATENT DOCUMENTS

DE 202007002456 U1 7/2008
JP 2011-226534 A 11/2011
(Continued)

*Primary Examiner* — Michael R Mansen
*Assistant Examiner* — Raveen J Dias
(74) *Attorney, Agent, or Firm* — Westerman, Hattori, Daniels & Adrian, LLP (57) ABSTRACT

To provide a chain tensioner that can suppress oil leakage from a gap between a plunger bore and a plunger to achieve stable damping characteristics and that can avoid an increase in production cost, with a simple structure. The chain tensioner includes a packing member that is provided on an inner circumferential side of the plunger bore and that suppresses oil leakage from a cylindrical outer surface of the plunger. The plunger is provided with an oil leak passage that extends from an oil pressure chamber inside the plunger to the outside.

5 Claims, 6 Drawing Sheets

(56) References Cited

U.S. PATENT DOCUMENTS

| | | | | |
|---|---|---|---|---|
| 5,911,641 A * | 6/1999 | Sheren | | F16H 7/0848 |
| | | | | 474/109 |
| 5,967,920 A * | 10/1999 | Dembosky | | F01L 1/02 |
| | | | | 474/109 |
| 5,967,921 A * | 10/1999 | Simpson | | F16H 7/08 |
| | | | | 474/110 |
| 5,989,139 A * | 11/1999 | Dusinberre, II | | F16H 7/08 |
| | | | | 474/110 |
| 6,120,402 A * | 9/2000 | Preston | | F16H 7/08 |
| | | | | 474/109 |
| 6,126,563 A * | 10/2000 | Simpson | | F16H 7/0836 |
| | | | | 474/109 |
| 6,361,458 B1 * | 3/2002 | Smith | | F16H 7/0848 |
| | | | | 474/109 |
| 6,413,179 B1 * | 7/2002 | Koike | | F01L 1/02 |
| | | | | 474/109 |
| 6,994,644 B2 * | 2/2006 | Yoshida | | F16H 7/0848 |
| | | | | 474/110 |
| 8,100,792 B2 * | 1/2012 | Kawahara | | F16H 7/1236 |
| | | | | 474/110 |
| 8,512,184 B2 * | 8/2013 | Perissinotto | | F16H 7/0848 |
| | | | | 474/135 |
| 2007/0032321 A1 * | 2/2007 | Yoshida | | F16H 7/0848 |
| | | | | 474/109 |
| 2007/0054767 A1 * | 3/2007 | Yamada | | F16H 7/0848 |
| | | | | 474/109 |
| 2008/0139352 A1 * | 6/2008 | Sato | | F16H 7/0848 |
| | | | | 474/109 |
| 2009/0111628 A1 * | 4/2009 | Poiret | | F16H 7/0848 |
| | | | | 474/110 |
| 2009/0247336 A1 * | 10/2009 | Bongard | | F01L 1/022 |
| | | | | 474/110 |
| 2010/0222167 A1 * | 9/2010 | Chekansky | | F16H 7/0836 |
| | | | | 474/110 |
| 2011/0256970 A1 | 10/2011 | Nakano et al. | | |
| 2015/0240918 A1 * | 8/2015 | Emizu | | F16H 7/08 |
| | | | | 474/110 |
| 2017/0138444 A1 * | 5/2017 | Kurematsu | | F16H 7/0848 |
| 2019/0316657 A1 * | 10/2019 | Cobb | | F16H 7/08 |
| 2020/0271199 A1 * | 8/2020 | Hunt | | F16H 7/0848 |
| 2020/0284325 A1 * | 9/2020 | Hunt | | F16H 7/08 |

FOREIGN PATENT DOCUMENTS

| | | |
|---|---|---|
| JP | 2013142441 A | 7/2013 |
| WO | 2008101526 A1 | 8/2008 |

* cited by examiner

Related Art

Fig.6

Related Art

CHAIN TENSIONER

BACKGROUND OF THE INVENTION

1. Field of the Invention

The present invention relates to a chain tensioner including a tensioner body having a cylindrical plunger bore with an open end, a cylindrical plunger slidably inserted in the plunger bore and biased toward an open side of the plunger bore, an oil pressure chamber formed between the plunger bore and the plunger.

2. Description of the Related Art

It has been common practice to use a chain tensioner that maintains correct tension of a chain. For example, a chain guide mechanism has been known, which slidably guides, by means of a traveling guide shoe, a drive chain such as an endless roller chain passing over respective sprockets of a crankshaft and a cam shaft inside an engine room, and which uses a chain tensioner to bias a pivoting chain guide having the traveling guide shoe to maintain appropriate tension of the chain.

Figure 5:
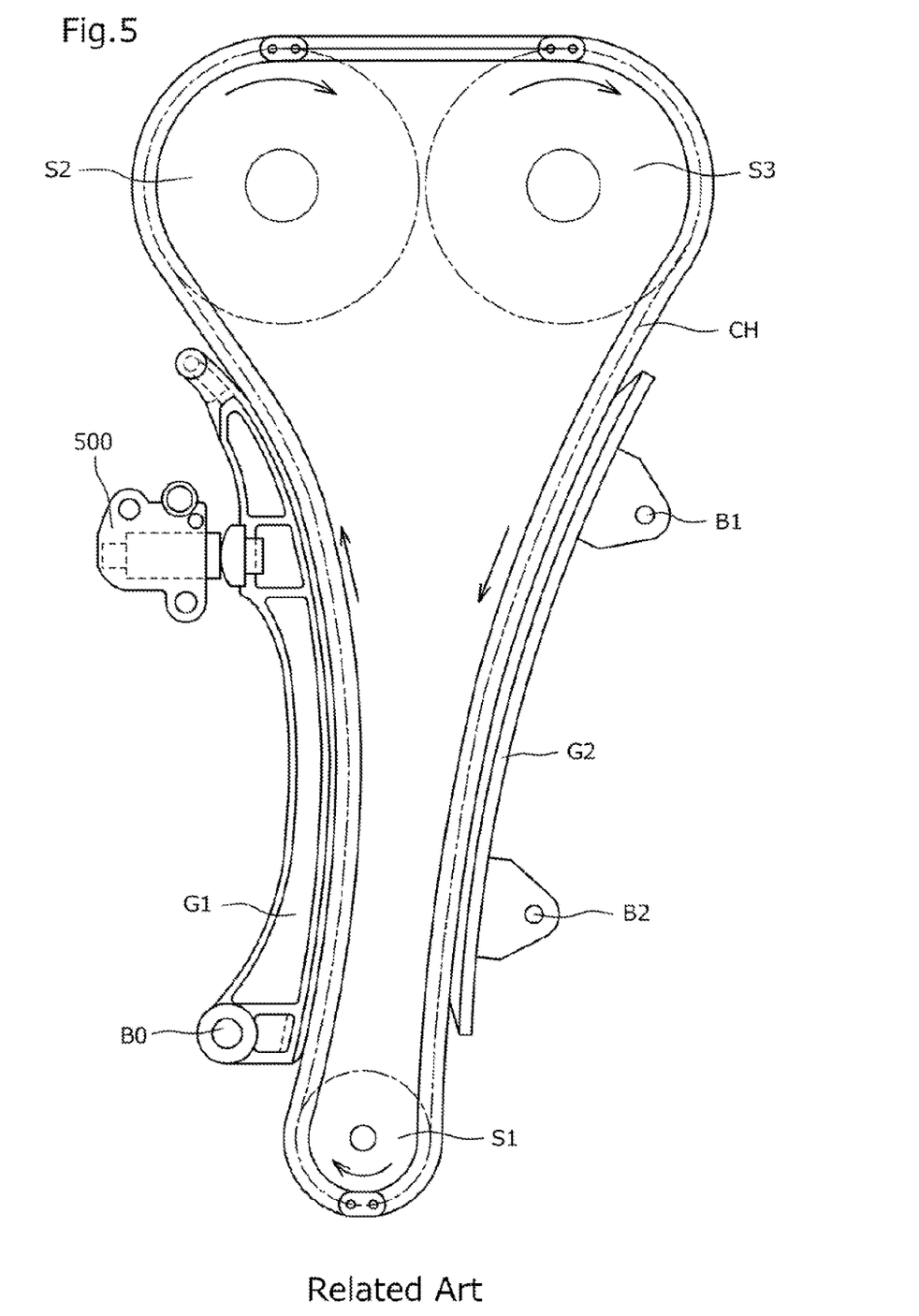
FIG. 5 is an illustrative diagram of a chain tensioner 500 used in a chain guide mechanism of an engine.

A chain guide mechanism is configured as shown in FIG. 5, for example, wherein a pivoting chain guide G1 and a fixed chain guide G2 guide an endless timing chain CH passing over a drive sprocket S1 of a crankshaft and a pair of driven sprockets S2 and S3 of cam shafts inside an engine room.

The fixed chain guide G2 is fixed in position in the engine room with two mounting shafts B1 and B2, while the pivoting chain guide G1 is attached such as to be pivotable around the mounting shaft B0 in the plane in which the timing chain CH runs in the engine room.

A chain tensioner 500 presses the pivoting chain guide G1 and thereby maintains the tension of the timing chain CH at an appropriate level as well as reduces its vibration.

Figure 6:
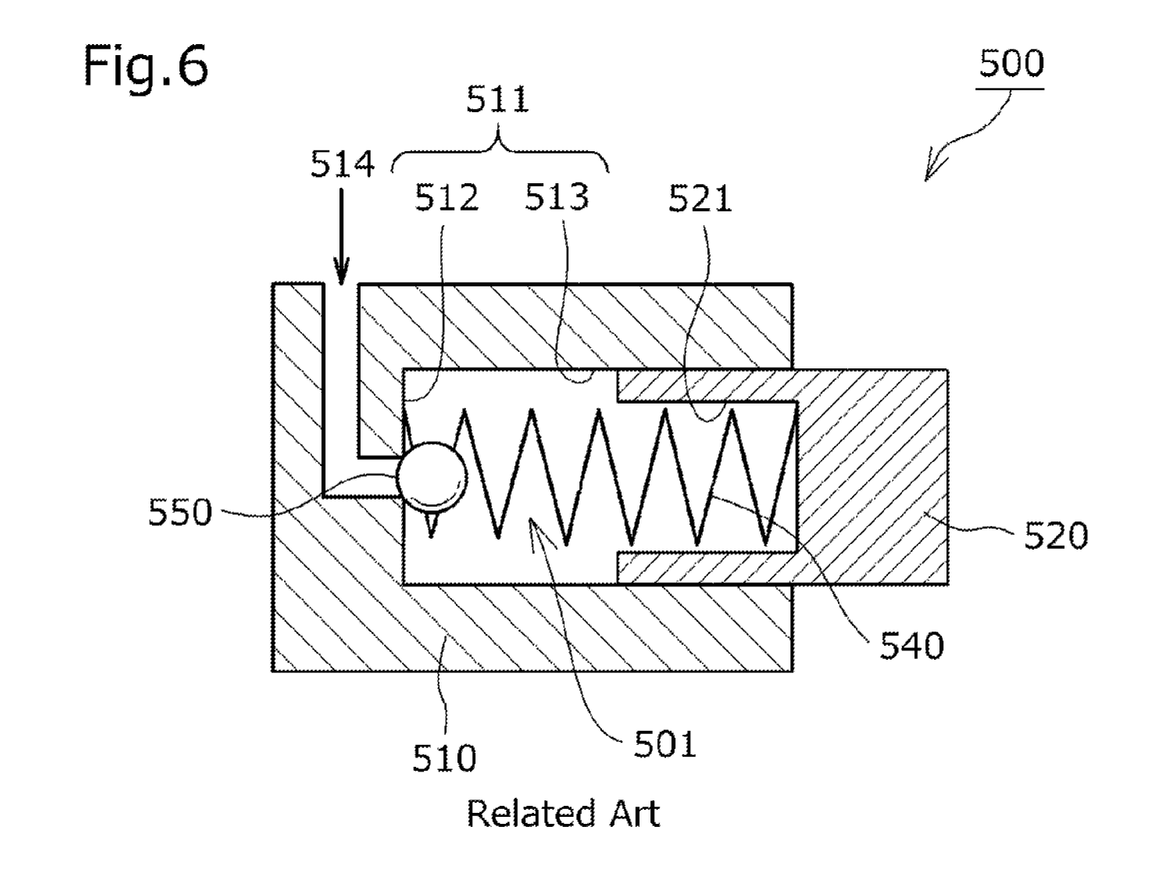
FIG. 6 is a schematic illustrative diagram of a conventional chain tensioner 500.

One known chain tensioner 500 used in such a chain guide mechanism includes, for example, as shown schematically in FIG. 6, a tensioner body 510 having a cylindrical plunger bore 511 with an open end, a cylindrical plunger 520 inserted in the plunger bore 511 to freely slide against a cylindrical surface 513 of the plunger bore 511, and biasing means that biases the plunger 520 to a front side, to which the plunger 520 moves outward from the plunger bore 511.

The biasing means is formed by a coil spring 540 accommodated inside a cylindrical recess 521 in the cylindrical plunger 520 and compressed between the plunger 520 and a bottom part 512 of the plunger bore 511.

Oil is supplied from an oil supply hole 514 formed in the plunger bore 511, so that an oil pressure chamber 501 formed between the plunger bore 511 and the plunger 520 is filled with the oil and the plunger 520 is biased outward by the oil. A check valve 550 (schematically shown as a check ball) stops the oil from flowing out from the oil supply hole 514.

As the plunger 520 reciprocates, the oil flows through a small gap between the plunger 520 and the plunger bore 511, and the flow resistance provides the damping effect of slowing down the reciprocal movement of the plunger 520.

In such a chain tensioner, in the event of an excessive tension developed in the timing chain during use, the pressure in the oil pressure chamber will be too high, which could generate noise or vibration, or cause damage to the timing chain.

In order to avoid such situations, chain tensioners provided with a relief passage, which has a predetermined flow resistance for preventing a sudden rise in pressure in the oil pressure chamber from reaching or exceeding a predetermined level, have been known. Moreover, a tensioner with variable flow resistance is known from Japanese Patent Application Laid-open No. 2011-226534 and the like.

SUMMARY OF THE INVENTION

The chain tensioner known from Japanese Patent Application Laid-open No. 2011-226534 and the like still has some scope of improvement.

Namely, oil sometimes leaks from a gap between the plunger bore and the plunger in the chain tensioner known from Japanese Patent Application Laid-open No. 2011-226534. Since the flow resistance varies with changes in the length of the flow passage depending on the positional relationship between the plunger bore and the plunger, the amount of leaking oil is not consistent, which could lead to unstable damping characteristics.

Oil leakage from the gap between the plunger bore and the plunger could be suppressed by minimizing the dimensional difference between the plunger bore and the plunger, which, however, would require higher precision in machining processes of the plunger and plunger bore and lead to increased production cost.

An object of the present invention is to solve these problems and provide a chain tensioner that can suppress oil leakage from a gap between the plunger bore and the plunger to achieve stable damping characteristics and that can avoid an increase in production cost, with a simple structure.

The present invention achieves the above object by providing: a chain tensioner including a tensioner body having a cylindrical plunger bore with an open end; a cylindrical plunger slidably inserted in the plunger bore and biased toward an open side of the plunger bore; and an oil pressure chamber formed between the plunger bore and the plunger, a packing member being provided on an inner circumferential side of the plunger bore and preventing oil from leaking from a cylindrical outer surface of the plunger, and an oil leak passage being provided in the plunger such as to extend from the oil pressure chamber inside the plunger to an outside.

According to one aspect of the present invention, a packing member is provided on an inner circumferential side of the plunger bore and prevents oil from leaking from a cylindrical outer surface of the plunger, and an oil leak passage is provided in the plunger such as to extend from the oil pressure chamber inside the plunger to the outside. Since the oil leakage from the gap between the plunger bore and the plunger is prevented, the oil can be released from the oil leak passage with a constant flow resistance without being affected by relative movements of the plunger bore and the plunger, whereby the damping characteristics can be made stable.

Since the inner circumferential surface of the plunger bore and the outer circumferential surface of the plunger need not be finished with precise dimensions and surface roughness, the machining process is made easy, and an increase in cost can be avoided.

According to another aspect of the present invention, an extension member slidable relative to the plunger is provided on the open side of the plunger bore in a manner fixedly attachable to the tensioner body, and an accommodating part that accommodates the packing member is provided in a connecting portion between the plunger bore and the extension member. Therefore the packing member can be disposed reliably at a predetermined position.

The packing member can be compressed by controlling the amount by which the extension member is pressed in, which enables adjustment of the bond between the packing member and the plunger.

Since the plunger bore need not be provided with an accommodating part such as a groove, the machining process is made easy, and an increase in cost can be avoided.

According to another aspect of the present invention, the oil leak passage includes an oil discharge hole extending in a radial direction of the plunger, and the extension member includes a plunger fixing hole extending in the radial direction of the plunger. By inserting a fixing pin, with the plunger pushed into the plunger bore, into the oil discharge hole through the plunger fixing hole of the extension member, the assembling work when the chain tensioner is attached to an engine block can be carried out safely without the need otherwise to keep the plunger pressed in.

According to another aspect of the present invention, at least the extension member is made of a resin material, so that the extension member is more inexpensive and easier to form as compared to when using a metal material, and can be press-fitted into the plunger bore more easily.

According to another aspect of the present invention, the chain tensioner further includes a fixing member that fixes the extension member and the tensioner body, so that displacement or separation of the extension member that may be caused by sliding movement relative to the plunger can be prevented.

DESCRIPTION OF THE PREFERRED EMBODIMENT

A chain tensioner 100 according to one embodiment of the present invention will be described below with reference to the drawings.

For ease of illustration, parts of the mechanism not directly relevant to the present invention will not be described.

Figure 1:
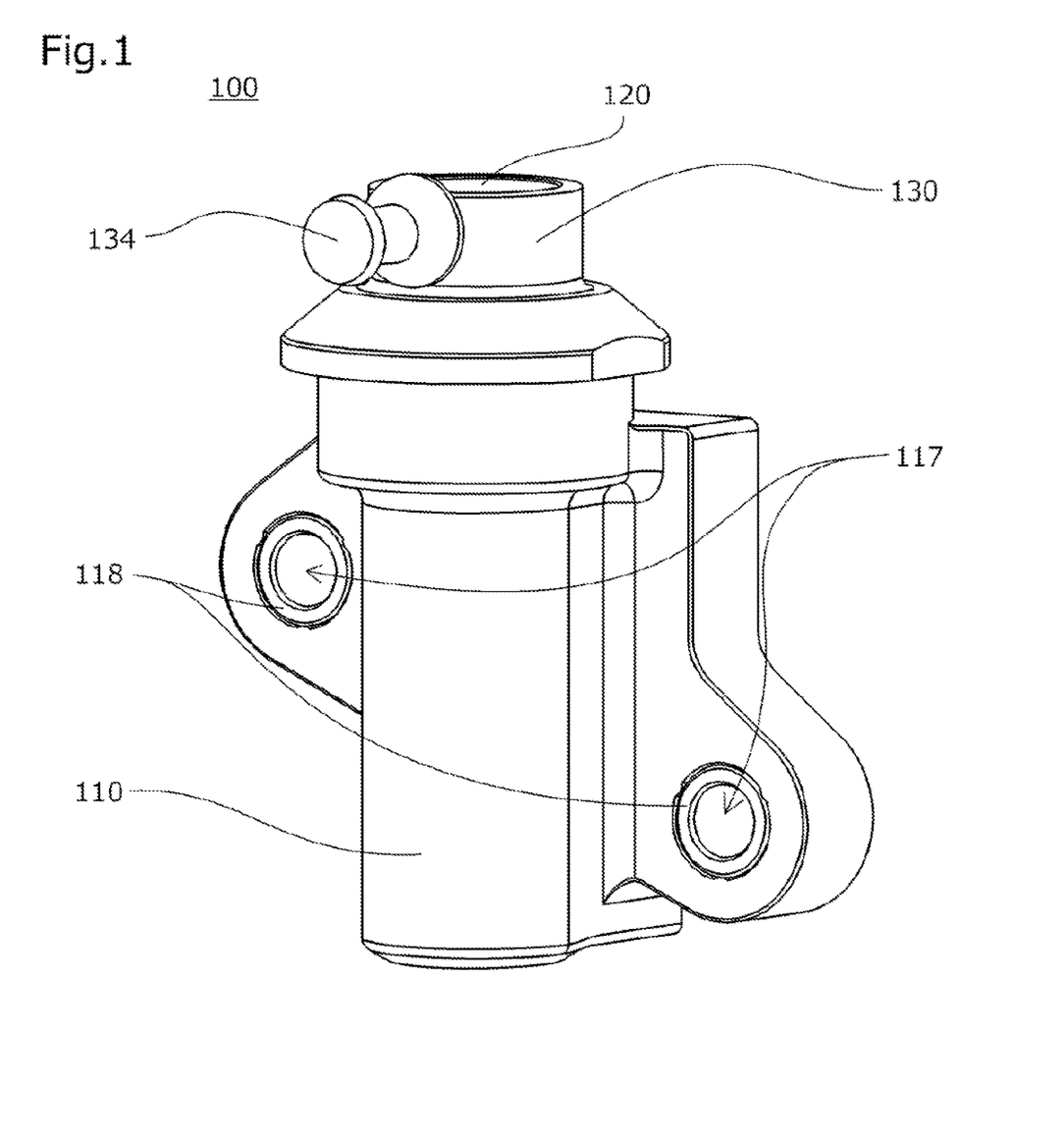
FIG. 1 is a perspective view of a chain tensioner 100 according to one embodiment of the present invention.
Figure 2:
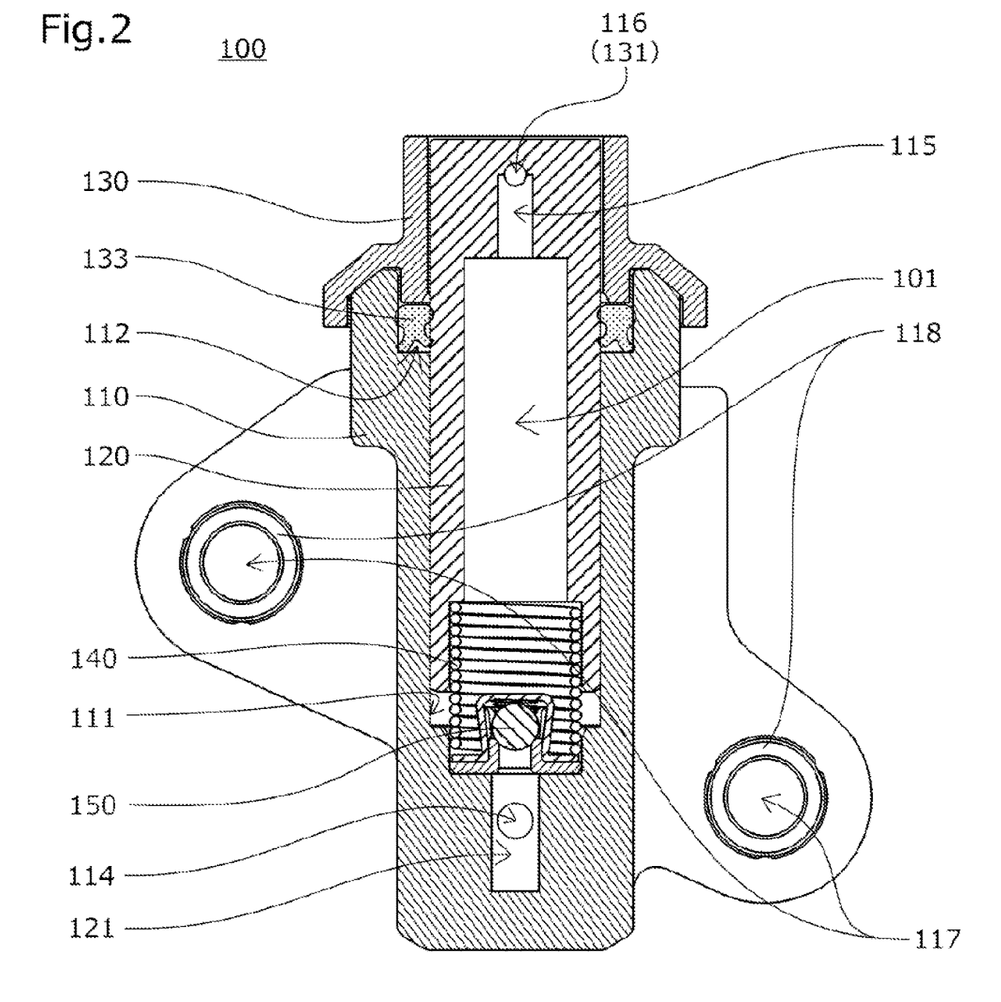
FIG. 2 is a front cross-sectional view of the chain tensioner 100 according to one embodiment of the present invention.

The chain tensioner 100 includes, as shown in FIG. 1 and FIG. 2, a tensioner body 110 having a cylindrical plunger bore 111 with an open end, a cylindrical plunger 120 slidably inserted in the plunger bore 111, and a coil spring 140 that is accommodated in an oil pressure chamber 101 formed between the plunger bore 111 and the plunger 120, such as to freely expand and contract, and that biases the plunger 120 to a front side to which the plunger 120 moves outward.

An extension member 130 is press-fitted to the open side of the plunger bore 111. To the oil pressure chamber 101 are connected: an oil leak passage 115 communicating with an oil discharge hole 116 that extends in a radial direction of the plunger 120 inside the plunger 120, and leading to the outside of the chain tensioner 100; and an oil reservoir chamber 121 leading to an oil supply hole 114 from which oil is supplied. A packing member 133 is provided in an accommodating part 112 formed between an inner circumferential side of the plunger bore 111 and the extension member 130.

The extension member 130 is formed with a plunger fixing hole 131 radially extending through the extension member 130. By inserting a fixing pin 134 into the oil discharge hole 116 of the plunger 120 through the plunger fixing hole 131, the assembling work when the chain tensioner 100 is attached to an engine block can be carried out safely without the need otherwise to keep the plunger 120 pressed in.

As the oil leak passage 115 is bent midway, it can have a longer distance, which enables the designed oil release amount to be set in a wider range.

In this embodiment, the tensioner body 110 is provided with mounting holes 117 for fixedly attaching the tensioner body 110 to an engine block with bolts or the like, and sleeves 118 fixedly fitted in the mounting holes 117.

Thus, even when the tensioner body 110 is made of a resin material, wear of the mounting holes 117 can be prevented if the sleeves 118 are made of a metal material, whereby a positional displacement of the chain tensioner 100 can be prevented.

A check valve unit 150, which stops reverse flow of oil that has entered the oil pressure chamber 101 back into the oil reservoir chamber 121, is provided between the oil pressure chamber 101 and the oil reservoir chamber 121.

Figure 3:
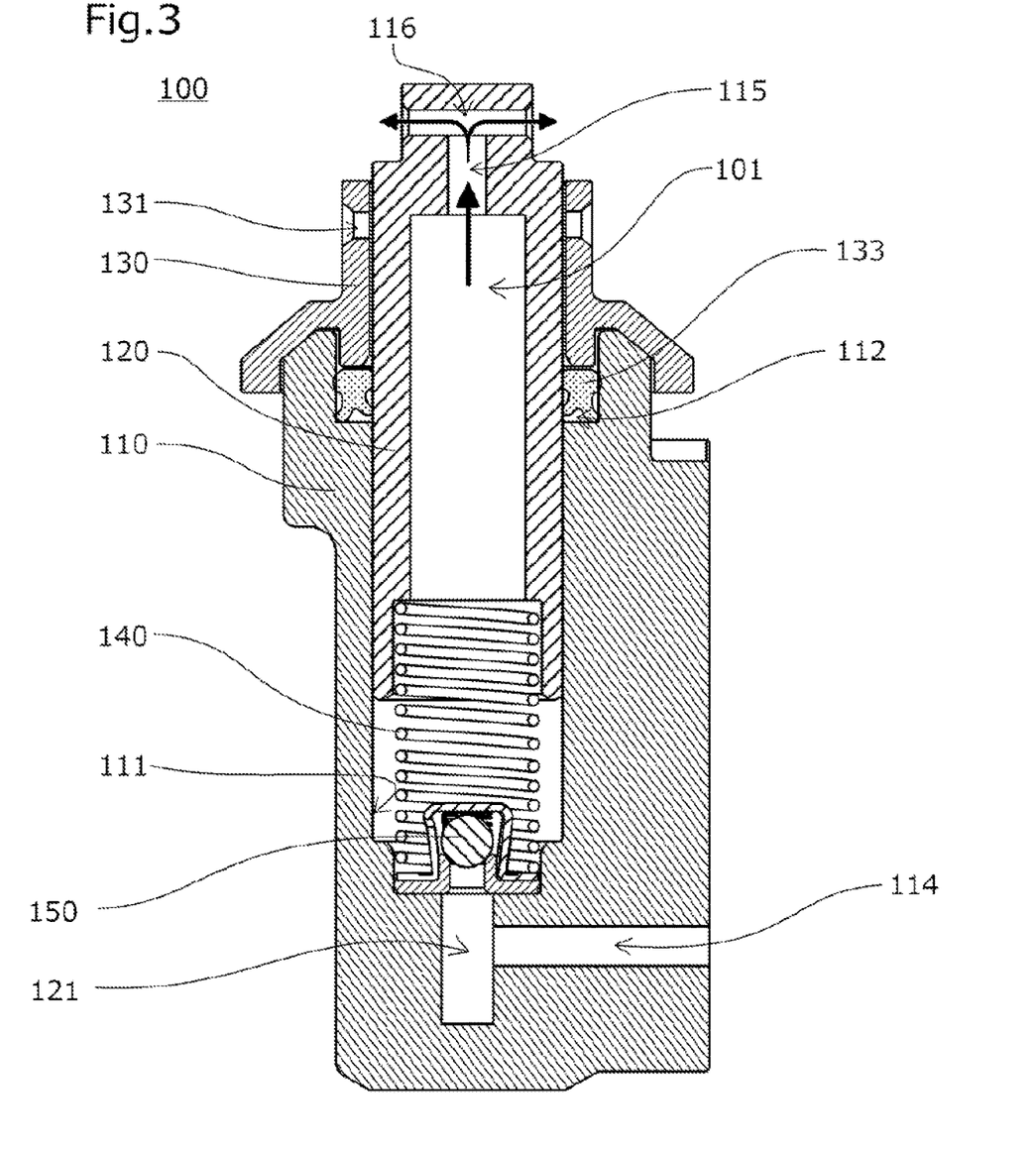
FIG. 3 is a side cross-sectional view showing how oil leaks out during use of the chain tensioner 100 according to one embodiment of the present invention.

Next, how oil leaks out during use of the chain tensioner 100 will be described with reference to FIG. 3.

The chain tensioner 100 presses a pivoting chain guide with the distal end of the plunger 120 to keep correct tension of the timing chain as well as to reduce its vibration.

A small amount of oil inside the oil pressure chamber 101 leaks out to allow the plunger 120 to slightly reciprocate so that vibration of the timing chain is effectively suppressed. If, however, oil leaks out from a gap between the plunger bore 111 and the plunger 120, the amount of leaking oil may vary because the flow resistance varies as the length of flow passage changes in accordance with the position of the plunger 120, and this could lead to unstable damping characteristics.

The chain tensioner 100 according to one embodiment of the present invention is provided with a packing member 133 in the accommodating part 112 on the inner side of the plunger bore 111, i.e., the flow passage through the gap between the plunger bore 111 and the plunger 120 is blocked by the packing member 133. Therefore, the oil flows through the oil leak passage 115 and is discharged only from the oil discharge hole 116. The amount of leaking oil is thus made consistent, irrespective of the position of the plunger 120, so that the damping characteristics can be made stable.

Moreover, since the oil leaks out from the distal end of the plunger 120 of this chain tensioner 100, the oil that comes out from the plunger 120 can be applied directly to the shoe side and effectively used for lubrication of the chain.

If the bond between the packing member 133 and the plunger 120 is insufficient, the bond between the packing member 133 and the plunger 120 can be adjusted by controlling the amount by which the extension member 130 is pressed into the plunger bore 111 to compress the packing member 133.

Figure 4:
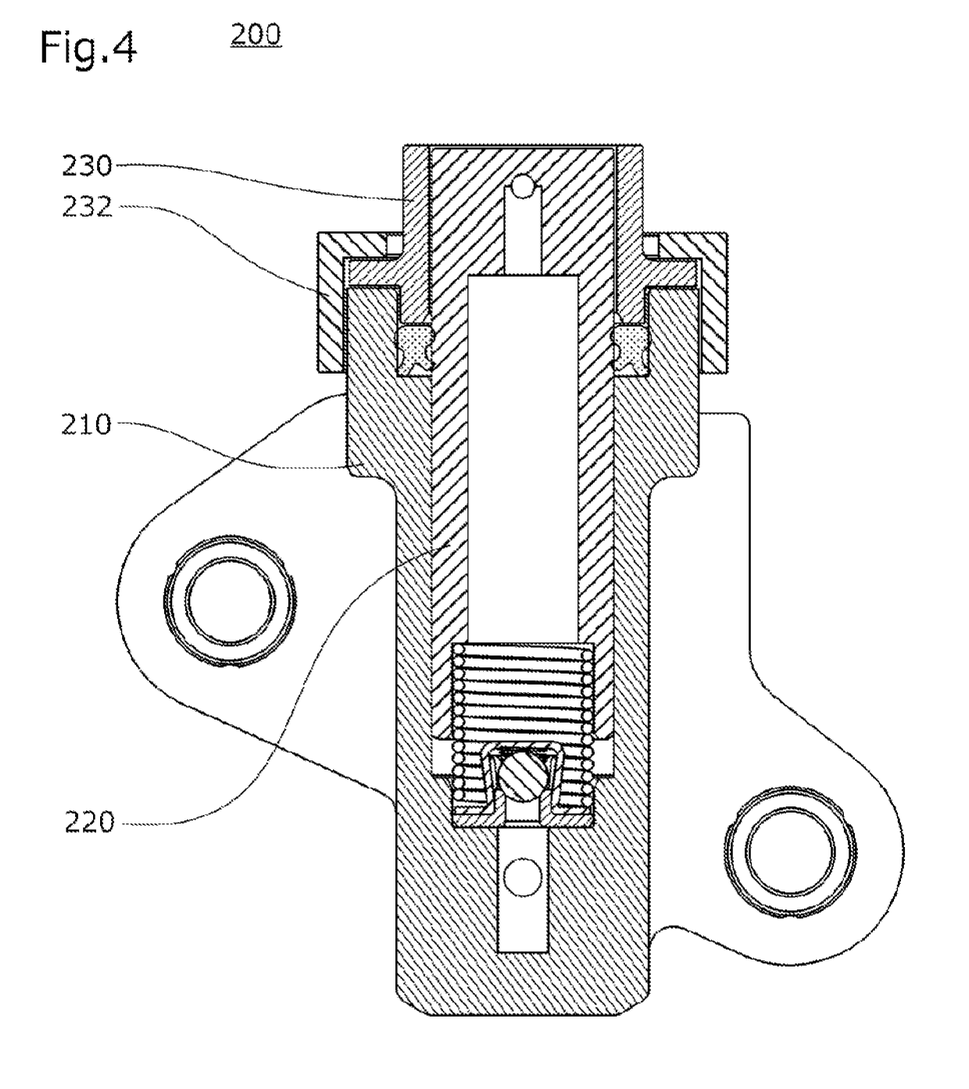
FIG. 4 is a front cross-sectional view of the chain tensioner 200 according to one embodiment of the present invention.

A fixing member 232 connectable to the tensioner body 210 by screw engagement or the like may be provided as in a chain tensioner 200 shown in FIG. 4 so that the extension member 230 is fixedly sandwiched between the tensioner body 210 and the fixing member 232. Thereby, displacement or separation of the extension member 230 that may be caused by sliding movement relative to the plunger 220 can be prevented.

While the embodiment of the present invention has been described above in detail, the present invention is net limited to this embodiment and may be carried out with various design changes without departing from the scope of the present invention set forth in the claims.

While the extension member is press-fitted to the open side of the plunger bore in the embodiment described above, the method of attaching the extension member is not limited to this. For example, the extension member may be attached to the tensioner body with an adhesive or by welding, or by screw engagement with an inner circumferential surface of the plunger bore.

While the accommodating part is formed between the inner circumferential side of the plunger bore and the extension member in the embodiment described above, the method of forming the accommodating part is not limited to this. For example, a groove-like accommodating part may be formed only on the inner circumferential side of the plunger bore, or, a groove-like accommodating part may be formed only on the inner circumferential side of the extension member.

While the fixing member is configured to be connected to the tensioner body by screw engagement or the like and to fixedly sandwich the extension member between itself and the tensioner body in the embodiment described above, the configuration of the fixing member is not limited to this. For example, the tensioner body and the fixing member may be formed integrally, and the open side of the fixing member may be swaged to fixedly attach the extension member.

While the oil discharge hole is formed to extend in a radial direction of the plunger in the embodiment described above, the method of forming the oil discharge hole is not limited to this. For example, the oil discharge hole may be formed to extend toward the distal end of the plunger, or to extend both in a radial direction of the plunger and toward the distal end of the plunger.

While the extension member is provided with a plunger fixing hole extending in a radial direction through the extension member, and a fixing pin is inserted into the oil discharge hole of the plunger via the plunger fixing hole in the embodiment described above, the configuration of the extension member is not limited to this. For example, there may not be the plunger fixing hole.

While the tensioner body is provided with mounting holes and sleeves fixedly fitted to the mounting holes in the embodiment described above, the configuration of the tensioner body is not limited to this. For example, there may not be the sleeves.

The tensioner body, plunger, and extension member need not be finished with precise dimensions or surface roughness, and at least one or all of them may be formed from a resin material.

What is claimed is:

1. A chain tensioner comprising: a tensioner body having a cylindrical plunger bore with an open end; a cylindrical plunger slidably inserted in the cylindrical plunger bore and biased toward an open side of the cylindrical plunger bore; and an oil pressure chamber formed between the cylindrical plunger bore and the cylindrical plunger,
    a packing member being provided on an inner circumferential side of the cylindrical plunger bore and preventing oil from leaking from a cylindrical outer surface of the cylindrical plunger,
    an oil leak passage being formed in the cylindrical plunger such as to extend from the oil pressure chamber inside the cylindrical plunger to an outside,
    an extension member slidable relative to the cylindrical plunger is provided on the open side of the cylindrical plunger bore in a manner fixedly attachable to the tensioner body,
    an accommodating part that accommodates the packing member is provided on an inner circumferential surface of the cylindrical plunger bore,
    the accommodating part is expanded on the open side of the cylindrical plunger bore, and
    the extension member is configured to be able to enter the accommodating part to a position where the packing member is compressed in an axial direction of the cylindrical plunger.

2. The chain tensioner according to claim 1, wherein the accommodating part that accommodates the packing member is provided in a connecting portion between the cylindrical plunger bore and the extension member.

3. The chain tensioner according to claim 2, wherein the oil leak passage includes an oil discharge hole extending in a radial direction of the cylindrical plunger, and the extension member includes a plunger fixing hole extending in the radial direction of the cylindrical plunger.

4. The chain tensioner according to claim 1, wherein at least the extension member is made of a resin material.

5. The chain tensioner according to claim 1, further comprising a fixing member that fixes the extension member and the tensioner body.

\* \* \* \* \*